UNITED STATES PATENT OFFICE.

WILLIAM G. FUERTH, OF NEWARK, NEW JERSEY, ASSIGNOR TO EQUILIBRATOR COMPANY, OF NEWARK, NEW JERSEY, A CORPORATION OF NEW JERSEY.

INK.

1,013,544.      Specification of Letters Patent.      Patented Jan. 2, 1912.

No Drawing.      Application filed August 30, 1910. Serial No. 579,943.

*To all whom it may concern:*

Be it known that I, WILLIAM G. FUERTH, a citizen of the United States, residing in Newark, in the county of Essex and State of New Jersey, have invented certain new and useful Improvements in Ink, of which the following is a specification.

My invention relates to improvements in that class of inks used for copying machines known as the Underwood duplicator, mimeograph, neostyle, and similar machines, where the ink is fed through a perforated cylinder on to a cloth mat or other device by which the ink is delivered directly to the stencil from which the copy is made.

My invention has more particularly for its object, the production of an ink, emulsive in form, permanent in character, unaffected by changes of temperature, and adaptable to various forms of stencil duplicating machines, and which will also give a perfect impression from a hand written or a typewritten copy.

My invention also particularly relates to inks capable of being used with various forms of perforated metal plates through which the ink is fed and readily adaptable to those various forms, and which will not have any chemical effect upon the metal surfaces of these plates and which will also be neutral to the coated wax sheets used for duplicating purposes.

I use an emulsion of dextrin and acetated glycerin, compounded with a vegetable or fixed oil, such as rapeseed oil preferably blown, zinc oxid, and an earthy filling such as "blanc fixe" or sulfate of barium. These may be used in the following proportions: 40 parts by weight of acetated glycerin. 40 parts rapeseed oil. 10 parts dextrin. 2 parts zinc oxid. 8 parts sulfate of barium. Coloring matter q. s.

There is more or less aqueous matter contained in commercial glycerin, and water is also present in the acid solution that is used in compounding the acetated glycerin (or acetin) which is hygroscopic. The glycerin is treated with acetic acid in the presence of heat until the water contained in the glycerin and in the acid is driven or distilled off. The dextrin is then incorporated with it; then the sulfate of barium is thoroughly incorporated with the compound; and then the oil is added. Other fatty or vegetable oils may be substituted, as lard oil, castor oil, linseed oil, etc. Acetated glycerin is miscible with heavy air-blown rapeseed oil. The oil is employed with the acetated glycerin to get the emulsive qualities and does not have the objectionable qualities of a hard soap, while at the same time the acetated glycerin makes the coloring matter take uniformly, which in this class of ink usually consists of an acid anilin color.

The barium sulfate preserves, in my ink, its well known valuable properties as a body material in paints and inks. The emulsifier dextrin as is well known makes the emulsion stable. The zinc oxid hastens or favors the drying of the ink on the paper that is stenciled.

The residuum of water in the ink is usually less than 2%, and is negligible. Owing to the absence of water, the ink is not liable to be affected by frost or cold.

The ink may be thinned, or its specific gravity reduced, by the use of a tarred mineral oil, or any other suitable reducing substance, to meet varying requirements. The quantity of sulfate of barium may be varied, to suit the different kinds of perforations in different stenciling machines.

Instead of sulfate of barium, above mentioned, any suitable filler, such as carbonate of magnesia, calcium carbonate, kaolin, or other inert mineral substance may be added, in which case the mixture is preferably ground before being used. I do not wish to be confined specifically to the use of the filler above mentioned. The use of such a filler is important in that it assists to preserve the emulsive properties of the ink, and also renders same of a consistency which flows easily from the brush, yet of a sufficient firmness to give a good typewritten impression.

It will be seen that my improved ink comprises a hygroscopic substance (acetated glycerin) which serves to prevent the ink from drying up or losing moisture, and which also adds miscibility to other components; and a substance which adds weight or body to the foregoing, so as to make the latter sufficiently stiff and non-flowing for stenciling purposes; this weighting agent being preferably sulfate of barium, which physically is very smooth and unctuous and of a lubricating nature, which enables it to flow with the requisite freedom through the pores of the stencil cylinder and through the ink mat, and also to pass through the opening in the delicate waxed stencil sheet without injury thereto.

The waxed stencil sheet is adjusted upon an ink-cloth or mat, and the latter firmly held upon a perforated metal cylinder or drum, the interior of which is charged with the stenciling ink herein disclosed, which passes through the perforations and is absorbed within the weave of the ink-mat. The paper sheet to be stenciled is passed between the drum and a pressure roll, which causes the ink to be drawn or pressed from the ink-mat through the stencil onto the paper sheet, whereby a printed or stencil copy is obtained.

By my invention I eliminate the objections of clogging of the perforations in the drum or of the pores in the mat, by the drying up of the ink, or by the formation of clots or lumps therein of one or more of its ingredients; of too copious flow of the ink; of the production of objectionable vacuums, or tendencies to produce the same, due to too great viscidity of the ink; and of oxidation or drying up, and "skinning" of the ink, that is, the formation of a skin thereon while in the stenciling machine.

My ink is a hygroscopic composition, which will remain moist in the stenciling machine even if printing is done only at long intervals; and it will not corrode the metal parts of the stenciling machine, or crystallize out. It will not clog the perforations nor clog the ink mat, and the latter remains serviceable until worn threadbare. It will dry with reasonable celerity, without running or spreading.

Having thus described my invention, I claim:

1. An ink for stencil duplicating purposes, comprising acetated glycerin, rapeseed oil, dextrin, zinc oxid, sulfate of barium, and coloring matter.

2. An ink for stencil duplicating purposes comprising 40 parts by weight of acetated glycerin, 40 parts of rapeseed oil, 10 parts of dextrin, 2 parts of zinc oxid, 8 parts of sulfate of barium, to which is added coloring matter.

3. An ink of which the major portion is formed of about equal quantities of fatty or vegetable oil and acetated glycerin, united by a binder, coloring matter, an earthy filler, and a drier.

4. An ink comprising a blown oil, acetated glycerin, an emulsifying agent, a filler, and zinc oxid.

5. An ink comprising a blown oil, acetated glycerin, an emulsifying agent, a drier, a filler, and a coloring agent.

6. An ink comprising a blown oil, acetated glycerin, dextrin, zinc oxid, and a filler.

7. An ink comprising a fixed vegetable oil, acetated glycerin, an emulsifying agent, a drier, a filler, and a color.

8. An ink comprising a fixed vegetable oil, acetated glycerin, an emulsifying agent, a drier, and a filler.

WILLIAM G. FUERTH.

Witnesses:
　HARRY J. MITCHELL,
　RICHARD PRACHT.